United States Patent
Barth et al.

(10) Patent No.: US 7,011,368 B2
(45) Date of Patent: Mar. 14, 2006

(54) STACKABLE CHILD RESTRAINT FOR AIRCRAFT

(75) Inventors: Thomas H. Barth, Toulouse (FR); Andrew W. Mackie, Barkam Wokingham (GB)

(73) Assignee: Am-Safe Aviation, Phoenix, AZ (US)

( * ) Notice: Subject to any disclaimer, the term of this patent is extended or adjusted under 35 U.S.C. 154(b) by 0 days.

(21) Appl. No.: 10/705,179

(22) Filed: Nov. 11, 2003

(65) Prior Publication Data
US 2005/0099046 A1 May 12, 2005

(51) Int. Cl.
*A47C 3/04* (2006.01)

(52) U.S. Cl. .................... 297/239; 297/250.1
(58) Field of Classification Search ............ 297/250.1, 297/DIG. 2, 256.17, 239; 108/91, 92, 53.1, 108/53.3
See application file for complete search history.

(56) References Cited

U.S. PATENT DOCUMENTS

| 3,335,434 | A | * | 8/1967 | Gamon | 297/153 |
| 4,341,419 | A | * | 7/1982 | Sebel | 297/239 |
| 4,743,063 | A | * | 5/1988 | Foster, Jr. | 297/130 |
| 4,891,454 | A | * | 1/1990 | Perdelwitz | 428/137 |
| 4,892,769 | A | * | 1/1990 | Perdelwitz | 428/68 |
| 5,022,669 | A | * | 6/1991 | Johnson | 280/30 |
| 5,647,493 | A | * | 7/1997 | Sippel | 108/53.3 |
| 5,779,304 | A | * | 7/1998 | Cunningham | 297/216.11 |
| 5,902,015 | A | * | 5/1999 | Allcock | 297/463.1 |
| 5,957,537 | A | * | 9/1999 | Hoolahan | 297/464 |
| 6,179,382 | B1 | * | 1/2001 | Schwartz | 297/239 |
| 6,382,722 | B1 | * | 5/2002 | Burleigh | 297/250.1 |
| 6,394,004 | B1 | * | 5/2002 | Lynn | 108/91 |
| 6,464,294 | B1 | * | 10/2002 | Kain | 297/250.1 |
| 6,592,183 | B1 | * | 7/2003 | Kain | 297/253 |
| 6,676,213 | B1 | * | 1/2004 | Dlugos | 297/256.11 |
| 6,811,125 | B1 | * | 11/2004 | Koefelda et al. | 108/53.1 |

* cited by examiner

*Primary Examiner*—Peter M. Cuomo
*Assistant Examiner*—Stephen D'Adamo
(74) *Attorney, Agent, or Firm*—Richard A. Speer; Mayer, Brown, Rowe & Maw LLP

(57) ABSTRACT

A child restraint for use with aircraft seats wherein the restraint is a one-piece shell-like body having integrally formed bottom and side walls that support the child and which permit nesting of the seats for compact storage.

4 Claims, 2 Drawing Sheets

STACKABLE CHILD RESTRAINT FOR AIRCRAFT

BACKGROUND OF THE INVENTION

Safety seats or other restraint systems suitable for protecting young children from injury during transport in moving vehicles have, in the past, taken many forms. Generally adapted for transport in automobiles, the restraint devices have been bulky and cumbersome to relocate once installed into the automobile. Such existing seat safety structures are difficult to use when a child is to occupy an aircraft seat and cannot be conveniently stored, because the construction does not permit integration of individual seat-type restraints into a volume less than a multiple of the volume required by each restraint.

BRIEF DESCRIPTION OF THE INVENTION

The present child restraint seat is one that can readily be used in conjunction with existing aircraft seats and seat restraints, specifically, the usual lap belt. It is also configured to be stored in nested or stacked condition, so that it can be stored on board aircraft, for use when required.

Broadly, the child restraint seat of this invention is a unitary or one-piece molded shell-like body which has flared or sloping side walls that enable a plurality of seats to be nested, one on top of the other. This construction enables a plurality of seats to be stored in a volume that is significantly more compact than is possible with prior existing constructions. The molded shell-like body has openings located at selected sites through which the customary aircraft lap belt can be threaded to secure the shell-like body to the aircraft seat. The location of the openings permits the shell-like body to be placed either in a forward facing direction or in a rearward facing direction, as desired. Alternatively, the child restraint seat can be placed on an adult's lap and the aircraft safety belt used to both secure the adult and simultaneously secure the child restraint seat. Additional openings are located at appropriate sites through the shell for mounting a child restraint harness and a cushion on the shell-like body. The invention can be further understood by reference to the accompanying specification and drawings, in which:

DETAILED DESCRIPTION OF THE INVENTION

Figure 1:
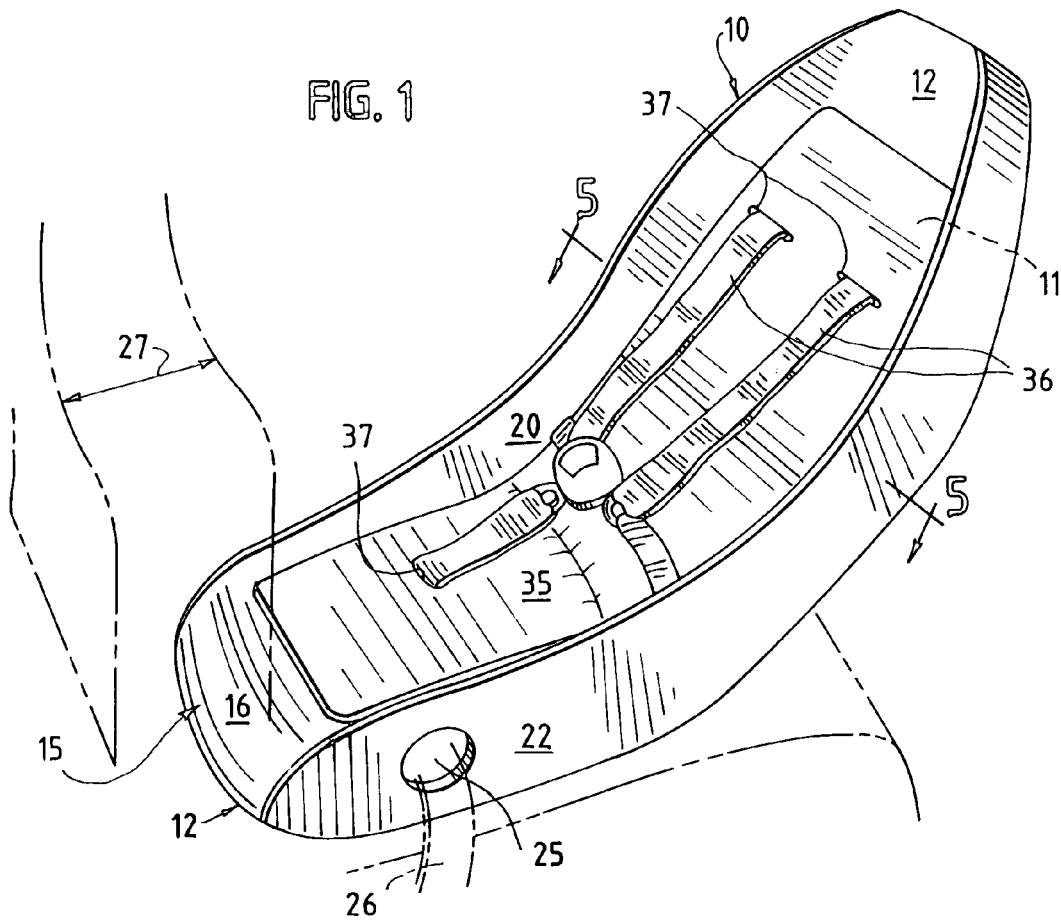
FIG. 1 in a front perspective of the child restraint seat mounted on an aircraft passenger seat.

To more clearly define the invention, reference is made first to FIG. 1 of the drawings where the numeral 10 identifies a one piece molded, shell-like body that is shaped to support a child and to also be stackable. Body 10 has a first upwardly extending shell portion 11 that defines a first surface 12 that is shaped to support a child's upper body part. Extending downwardly from the first supporting surface 12 is a second shell portion 15 which has a second surface 16 capable of supporting a child's lower body part. Extending upwardly and outwardly at an obtuse angle, and for a preselected length from the first and second support surfaces 12 and 16 are integral support flanges 20 and 21 that are present to provide support against lateral movement of the child's body.

First and second sidewalls 22 and 23 (see FIG. 2) are formed integrally with the first and second shell support flanges 20 and 21 and extend outwardly and downwardly from the support flanges a preselected length which is greater than the length of the support flanges and at an acute angle with respect thereto. The side walls thus extend outwardly and downwardly at an acute angle to permit the shell like bodies to be stored in nested relationship. Located at the lower end of second shell portion 15 are openings 25 that are located at a preselected distance away from the first shell portion 11. The selected distance is one at which the safety belt 26 will exert pressure on the body 10 that urges the body 10 down against the aircraft seat and rearwardly against the aircraft seat back. The openings 25 are present in order that an aircraft seat safety belt 26 can be passed through the lower part of the one piece shell-like body 10 to secure the shell to an aircraft seat. It should be noted that the position of the body 10 as shown in FIG. 1 is located in a rearward facing position but that the position of the shell-like body could be reversed so that the concave part of the shell would be facing forwardly with respect to the back of the aircraft seat, as indicated by the dotted lines 27.

Figure 2:
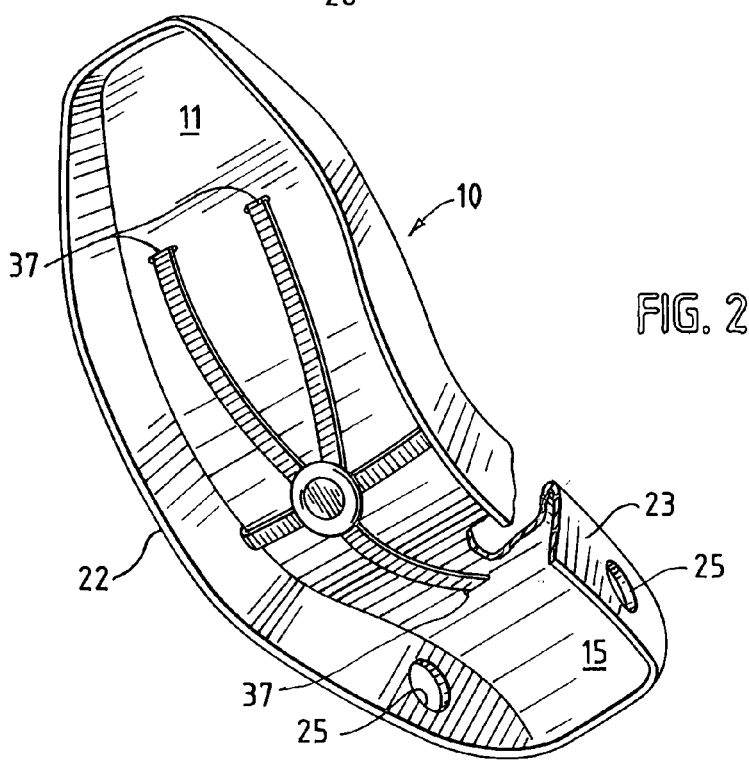
FIG. 2 is a perspective showing the back side of the seat of FIG. 1.
Figure 3:
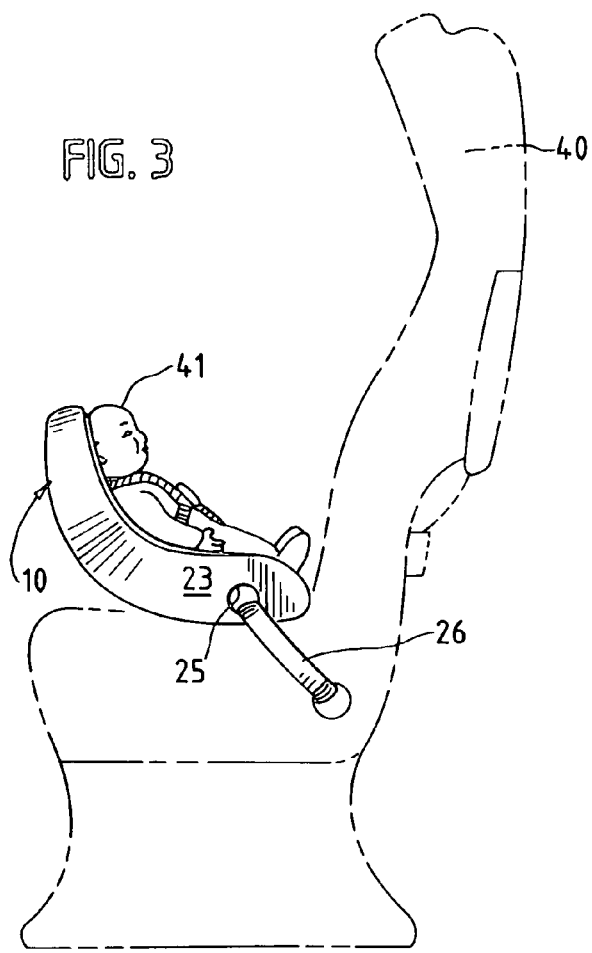
FIG. 3 is a side elevation of the child restraint showing a child in the safety seat in a rear-facing position.

Structure has been provided in the shell-like body 10 to permit the mounting of a pad 35 and a restraint harness 36 that will hold a child's body in position within shell-like body 10. The mounting of the cushion and of the safety harness is enabled by the formation of a plurality of openings 37 through which the straps can pass. The straps are secured together on the rear side of support surfaces 12 and 16 as shown in FIG. 2 of the drawings. FIG. 3 illustrates an aircraft seat 40 (illustrated by broken lines) which shows the manner in which a child 41 would be supported on the shell-like body 10 in a rear facing position. As can be seen the usual aircraft safety lap belt 26 is responsible for maintaining the child restraint seat in mounted position.

Figure 4:
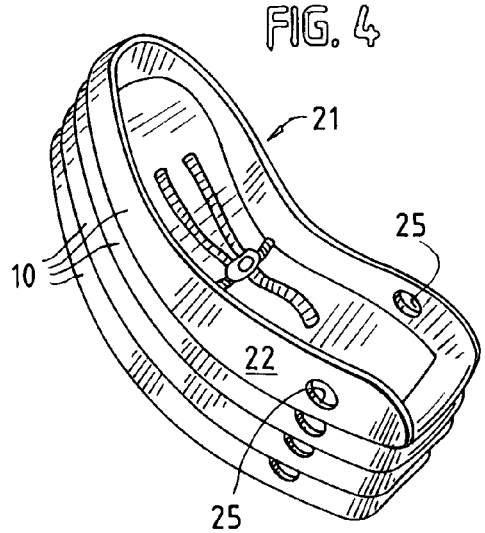
FIG. 4 is a perspective illustrating a plurality of stacked restraint seats.
Figure 5:
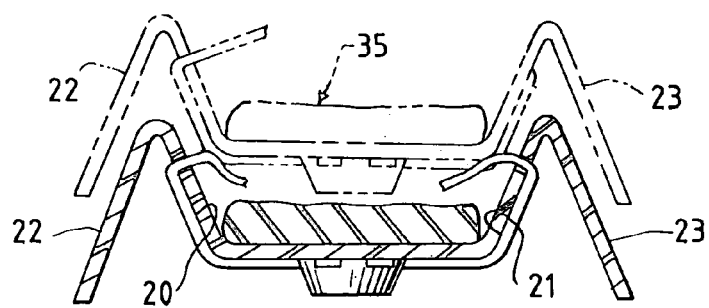
FIG. 5 is an end elevation, partly in section of the stack shown in FIG. 4.

FIG. 4 shows the manner in which a plurality of shells 10 would be superimposed one upon the other in nested or stacked condition for storage either on the ground or in a suitable space on board the aircraft for use as needed. FIG. 5 shows an end view, partially in section, of the shell body 10 of FIG. 5 as it would appear in the nested condition when in storage.

What is claimed is:

1. A child restraint seat for use with an aircraft passenger seat comprising a one-piece body having:

(a) a first, upwardly extending body portion defining a first surface shaped to support a child's upper body part and a second body portion extending downwardly from the first body portion, which has a second surface to support a child's lower body part;

(b) first and second integral support flanges extending upwardly and outwardly from the first and second support surfaces at an obtuse angle with respect thereto, to provide support surfaces against lateral movement of a child's body;

(c) first and second side walls formed integrally with the first and second shell support flanges and extending outwardly and downwardly from the support flanges at an acute angle with respect thereto and for a preselected length which is greater than the length of the support flanges, whereby a plurality of the one piece bodies can be stored in nested relationship; and (d) openings through the first and second side walls at a preselected distance away from the first child support surface, enabling an aircraft safety belt to be passed therethrough to secure the body to an aircraft seat.

2. A child restraint seat as defined in claim 1, wherein the first and second shell portions have openings for mounting a restraint harness on the shell part.

3. A child restraint seat as defined in claim 2, wherein a restraint harness is mounted on the shell part.

4. A child restraint seat as defined in claim 3, wherein a cushion is located on the first and second surfaces and held in position by the restraint harness.

* * * * *